(12) United States Patent
McAlister (10) Patent No.: US 8,413,634 B2
(45) Date of Patent: Apr. 9, 2013

(54) INTEGRATED FUEL INJECTOR IGNITERS WITH CONDUCTIVE CABLE ASSEMBLIES

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 161 days.

(21) Appl. No.: 12/841,146

(22) Filed: Jul. 21, 2010

(65) Prior Publication Data

US 2011/0057058 A1    Mar. 10, 2011

Related U.S. Application Data

(60) Continuation-in-part of application No. 12/653,085, filed on Dec. 7, 2009, which is a continuation-in-part of application No. 12/006,774, filed on Jan. 7, 2008, now Pat. No. 7,628,137, and a continuation-in-part of application No. 12/581,825, filed on Oct. 19, 2009, now Pat. No. 8,297,254, which is a division of application No. 12/006,774, and a continuation-in-part of application No. PCT/US2009/067044, filed on Dec. 7, 2009.

(60) Provisional application No. 61/237,466, filed on Aug. 27, 2009, provisional application No. 61/237,425, filed on Aug. 27, 2009, provisional application No. 61/237,479, filed on Aug. 27, 2009, provisional application No. 61/304,403, filed on Feb. 13, 2010, provisional application No. 61/312,100, filed on Mar. 9, 2010.

(51) Int. Cl.
*F02M 57/00* (2006.01)
*F02M 57/06* (2006.01)

(52) U.S. Cl.
USPC .......................................... 123/297; 123/490

(58) Field of Classification Search .................. 123/297, 123/445, 467, 673, 301, 305, 490, 498, 499; 239/533.2, 533.3, 585.1, 102.2; 174/70 R, 174/113 R, 114 R
See application file for complete search history.

(56) References Cited

U.S. PATENT DOCUMENTS

| | | | |
|---|---|---|---|
| 1,451,384 | A | 4/1923 | Whyte |
| 1,765,237 | A | 7/1938 | King |

(Continued)

FOREIGN PATENT DOCUMENTS

| | | | |
|---|---|---|---|
| DE | 3443022 | A1 | 5/1986 |
| DE | 102005060139 | * | 6/2007 |

(Continued)

OTHER PUBLICATIONS

"Ford DIS/EDIS "Waste Spark" Ignition System." Accessed: Jul. 15, 2010, Printed: Jun. 8, 2011. <http://rockledge.home.comcast.net/~rockledge/RangerPictureGallery/DIS_EDIS.htm>. pp. 1-4.

(Continued)

*Primary Examiner* — Mahmoud Gimie
(74) *Attorney, Agent, or Firm* — Perkins Coie LLP (57) ABSTRACT

The present disclosure is directed to a fuel injector assembly including a valve and a cable assembly for actuating the valve. The cable can include a plurality of strands, and each strand can be an optical fiber, an electrical conductor, or a tensile member capable of withstanding a tensile stress caused when the valve actuator actuates the valve, or any combination thereof. The cable can also include a brush bearing with bristles extending from the cable to maintain the cable at least generally centered within a channel as the cable moves in the channel. The bristles can be electrically conductive and can convey a voltage to an electrode pair near the valve to ionize at least a portion of the fuel to urge the fuel from the injector through the valve.

38 Claims, 7 Drawing Sheets

U.S. PATENT DOCUMENTS

| | | |
|---|---|---|
| 2,255,203 A | 9/1941 | Wiegand |
| 2,441,277 A | 5/1948 | Lamphere |
| 2,721,100 A | 10/1955 | Bodine, Jr. |
| 3,058,453 A | 10/1962 | May |
| 3,060,912 A | 10/1962 | May |
| 3,081,758 A | 3/1963 | May |
| 3,243,335 A | 3/1966 | Faile |
| 3,286,164 A | 11/1966 | De Huff |
| 3,373,724 A | 3/1968 | Papst |
| 3,391,680 A | 7/1968 | Benson |
| 3,520,961 A | 7/1970 | Suda et al. |
| 3,542,293 A * | 11/1970 | Bishop et al. .................. 239/95 |
| 3,594,877 A | 7/1971 | Suda et al. |
| 3,608,050 A | 9/1971 | Carman et al. |
| 3,689,293 A | 9/1972 | Beall |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,020,803 A | 5/1977 | Thuren et al. |
| 4,066,046 A | 1/1978 | McAlister |
| 4,095,580 A | 6/1978 | Murray et al. |
| 4,105,004 A | 8/1978 | Asai et al. |
| 4,116,389 A | 9/1978 | Furtah et al. |
| 4,122,816 A | 10/1978 | Fitzgerald et al. |
| 4,135,481 A | 1/1979 | Resler, Jr. |
| 4,172,921 A | 10/1979 | Kiefer |
| 4,183,467 A | 1/1980 | Sheraton et al. |
| 4,203,393 A | 5/1980 | Giardini |
| 4,281,797 A * | 8/1981 | Kimata et al. ........... 239/533.12 |
| 4,293,188 A | 10/1981 | McMahon |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,700,891 A | 10/1987 | Hans et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | Lasota |
| 4,834,033 A | 5/1989 | Larsen |
| 4,841,925 A | 6/1989 | Ward |
| 4,922,883 A | 5/1990 | Iwasaki |
| 4,932,263 A | 6/1990 | Wlodarczyk |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,069,189 A | 12/1991 | Saito |
| 5,072,617 A | 12/1991 | Weiss |
| 5,076,223 A | 12/1991 | Harden et al. |
| 5,095,742 A | 3/1992 | James et al. |
| 5,107,673 A | 4/1992 | Sato et al. |
| 5,109,817 A | 5/1992 | Cherry |
| 5,131,376 A | 7/1992 | Ward et al. |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,377,633 A | 1/1995 | Wakeman |
| 5,390,546 A | 2/1995 | Wlodarczyk |
| 5,392,745 A | 2/1995 | Beck |
| 5,394,838 A | 3/1995 | Chandler |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,662,389 A | 9/1997 | Truglio et al. |
| 5,676,026 A | 10/1997 | Tsuboi et al. |
| 5,694,761 A | 12/1997 | Griffin |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,704,553 A | 1/1998 | Wieczorek et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |
| 5,876,659 A | 3/1999 | Yasutomi et al. |
| 5,915,272 A | 6/1999 | Foley et al. |
| 5,930,420 A | 7/1999 | Atkins et al. |
| 5,941,207 A | 8/1999 | Anderson et al. |
| 5,947,091 A | 9/1999 | Krohn et al. |
| 5,975,032 A | 11/1999 | Iwata |
| 5,983,855 A | 11/1999 | Benedikt et al. |
| 6,000,628 A | 12/1999 | Lorraine |
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | VanDyne |
| 6,042,028 A | 3/2000 | Xu |
| 6,062,498 A | 5/2000 | Klopfer |
| 6,081,183 A | 6/2000 | Mading et al. |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,131,607 A | 10/2000 | Cooke |
| 6,138,639 A | 10/2000 | Hiraya et al. |
| 6,155,212 A | 12/2000 | McAlister |
| 6,173,913 B1 | 1/2001 | Shafer et al. |
| 6,185,355 B1 | 2/2001 | Hung |

| | | |
|---|---|---|
| 6,189,522 B1 | 2/2001 | Moriya |
| 6,204,594 B1 * | 3/2001 | Ingham .................. 313/141 |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,318,306 B1 | 11/2001 | Komatsu |
| 6,335,065 B1 | 1/2002 | Steinlage et al. |
| 6,338,445 B1 | 1/2002 | Lambert et al. |
| 6,340,015 B1 | 1/2002 | Benedikt et al. |
| 6,360,721 B1 | 3/2002 | Schuricht et al. |
| 6,378,485 B2 | 4/2002 | Elliott |
| 6,386,178 B1 | 5/2002 | Rauch |
| 6,446,597 B1 | 9/2002 | McAlister |
| 6,453,660 B1 | 9/2002 | Johnson et al. |
| 6,455,173 B1 | 9/2002 | Marijnissen et al. |
| 6,455,451 B1 | 9/2002 | Brodkin et al. |
| 6,478,007 B2 | 11/2002 | Miyashita et al. |
| 6,483,311 B1 | 11/2002 | Ketterer |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,517,623 B1 | 2/2003 | Brodkin et al. |
| 6,532,315 B1 | 3/2003 | Hung et al. |
| 6,536,405 B1 | 3/2003 | Rieger et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,550,458 B2 | 4/2003 | Yamakado et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,599,028 B1 | 7/2003 | Shu et al. |
| 6,615,810 B2 | 9/2003 | Funk et al. |
| 6,615,899 B1 | 9/2003 | Woodward et al. |
| 6,619,269 B1 | 9/2003 | Stier et al. |
| 6,621,964 B2 | 9/2003 | Quinn et al. |
| 6,647,948 B2 | 11/2003 | Kyuuma et al. |
| 6,663,027 B2 | 12/2003 | Jameson et al. |
| 6,668,630 B1 | 12/2003 | Kuglin et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Enomoto et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,745,744 B2 | 6/2004 | Suckewer et al. |
| 6,748,918 B2 | 6/2004 | Rieger et al. |
| 6,749,043 B2 | 6/2004 | Brown et al. |
| 6,755,175 B1 | 6/2004 | McKay et al. |
| 6,756,140 B1 | 6/2004 | McAlister |
| 6,763,811 B1 | 7/2004 | Tamol, Sr. |
| 6,776,352 B2 | 8/2004 | Jameson |
| 6,779,513 B2 | 8/2004 | Pellizzari et al. |
| 6,796,516 B2 | 9/2004 | Maier et al. |
| 6,799,513 B2 | 10/2004 | Schafer |
| 6,802,894 B2 | 10/2004 | Brodkin et al. |
| 6,811,103 B2 | 11/2004 | Gurich et al. |
| 6,814,313 B2 | 11/2004 | Petrone et al. |
| 6,832,472 B2 | 12/2004 | Huang et al. |
| 6,832,588 B2 | 12/2004 | Herden et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,883,490 B2 | 4/2005 | Jayne |
| 6,892,971 B2 | 5/2005 | Rieger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,940,213 B1 | 9/2005 | Heinz et al. |
| 6,954,074 B2 | 10/2005 | Zhu et al. |
| 6,955,154 B1 | 10/2005 | Douglas |
| 6,959,693 B2 | 11/2005 | Oda |
| 6,976,683 B2 | 12/2005 | Eckert et al. |
| 6,984,305 B2 | 1/2006 | McAlister |
| 6,993,960 B2 | 2/2006 | Benson |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,077,379 B1 | 7/2006 | Taylor |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,137,382 B2 | 11/2006 | Zhu et al. |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,198,208 B2 | 4/2007 | Dye et al. |
| 7,201,136 B2 | 4/2007 | McKay et al. |
| 7,204,133 B2 | 4/2007 | Benson et al. |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,272,487 B2 | 9/2007 | Christen et al. |
| 7,278,392 B2 | 10/2007 | Zillmer et al. |
| 7,305,971 B2 | 12/2007 | Fujii |
| 7,309,029 B2 | 12/2007 | Boecking |
| 7,340,118 B2 | 3/2008 | Wlodarczyk et al. |
| 7,367,319 B2 | 5/2008 | Kuo et al. |
| 7,386,982 B2 | 6/2008 | Runkle et al. |
| 7,404,395 B2 | 7/2008 | Yoshimoto |
| 7,409,929 B2 | 8/2008 | Miyahara et al. |
| 7,418,940 B1 | 9/2008 | Yi et al. |
| 7,481,043 B2 | 1/2009 | Hirata et al. |
| 7,484,369 B2 | 2/2009 | Myhre |
| 7,513,222 B2 | 4/2009 | Orlosky |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,625,531 B1 | 12/2009 | Coates et al. |
| 7,626,315 B2 | 12/2009 | Nagase |
| 7,628,137 B1 | 12/2009 | McAlister |
| 7,650,873 B2 | 1/2010 | Hofbauer et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,728,489 B2 | 6/2010 | Heinz et al. |
| 7,849,833 B2 | 12/2010 | Toyoda |
| 7,880,193 B2 | 2/2011 | Lam |
| 7,886,993 B2 | 2/2011 | Bachmaier et al. |
| 7,898,258 B2 | 3/2011 | Neuberth et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 8,069,836 B2 | 12/2011 | Ehresman |
| 2002/0017573 A1 | 2/2002 | Sturman |
| 2002/0070287 A1 | 6/2002 | Jameson et al. |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131686 A1 | 9/2002 | Hung |
| 2002/0131706 A1 | 9/2002 | Hung |

| | | | |
|---|---|---|---|
| 2002/0131756 A1 | 9/2002 | Hung | |
| 2002/0141692 A1 | 10/2002 | Hung | |
| 2002/0150375 A1 | 10/2002 | Hung et al. | |
| 2002/0151113 A1 | 10/2002 | Hung et al. | |
| 2002/0166536 A1 | 11/2002 | Hitomi et al. | |
| 2003/0012985 A1 | 1/2003 | McAlister | |
| 2003/0042325 A1 | 3/2003 | D'Arrigo | |
| 2003/0111042 A1* | 6/2003 | Rieger et al. | 123/297 |
| 2003/0127531 A1 | 7/2003 | Hohl | |
| 2004/0008989 A1 | 1/2004 | Hung | |
| 2004/0256495 A1 | 12/2004 | Baker | |
| 2005/0045146 A1 | 3/2005 | McKay et al. | |
| 2005/0098663 A1 | 5/2005 | Ishii | |
| 2005/0255011 A1 | 11/2005 | Greathouse et al. | |
| 2005/0257776 A1 | 11/2005 | Bonutti | |
| 2006/0005738 A1 | 1/2006 | Kumar | |
| 2006/0005739 A1 | 1/2006 | Kumar | |
| 2006/0016916 A1 | 1/2006 | Petrone et al. | |
| 2006/0037563 A1 | 2/2006 | Raab et al. | |
| 2006/0102140 A1 | 5/2006 | Sukegawa et al. | |
| 2006/0108452 A1 | 5/2006 | Anzinger et al. | |
| 2006/0169244 A1 | 8/2006 | Allen | |
| 2006/0237220 A1* | 10/2006 | Leyendecker | 174/113 R |
| 2007/0142204 A1 | 6/2007 | Park et al. | |
| 2007/0189114 A1 | 8/2007 | Reiner et al. | |
| 2007/0283927 A1 | 12/2007 | Fukumoto et al. | |
| 2008/0072871 A1 | 3/2008 | Vogel et al. | |
| 2008/0081120 A1 | 4/2008 | Van Ooij et al. | |
| 2008/0098984 A1 | 5/2008 | Sakamaki | |
| 2008/0103672 A1 | 5/2008 | Ueda et al. | |
| 2009/0078798 A1 | 3/2009 | Gruendl et al. | |
| 2009/0093951 A1 | 4/2009 | McKay et al. | |
| 2009/0204306 A1 | 8/2009 | Goeke et al. | |
| 2009/0264574 A1 | 10/2009 | Van Ooij et al. | |
| 2010/0020518 A1 | 1/2010 | Bustamante | |
| 2010/0043758 A1 | 2/2010 | Caley | |
| 2010/0077986 A1 | 4/2010 | Chen | |
| 2010/0108023 A1 | 5/2010 | McAlister | |
| 2010/0183993 A1 | 7/2010 | McAlister | |
| 2011/0036309 A1 | 2/2011 | McAlister | |
| 2011/0042476 A1 | 2/2011 | McAlister | |
| 2011/0048371 A1 | 3/2011 | McAlister | |
| 2011/0048374 A1 | 3/2011 | McAlister | |
| 2011/0048381 A1 | 3/2011 | McAlister | |
| 2011/0056458 A1 | 3/2011 | McAlister | |
| 2011/0132319 A1 | 6/2011 | McAlister | |
| 2011/0134049 A1 | 6/2011 | Lin et al. | |
| 2011/0146619 A1 | 6/2011 | McAlister | |
| 2011/0210182 A1 | 9/2011 | McAlister | |
| 2011/0233308 A1 | 9/2011 | McAlister | |
| 2011/0253104 A1 | 10/2011 | McAlister | |
| 2011/0297753 A1 | 12/2011 | McAlister et al. | |

FOREIGN PATENT DOCUMENTS

| | | |
|---|---|---|
| EP | 392594 | 10/1990 |
| EP | 671555 | 9/1995 |
| EP | 1972606 A1 | 9/2008 |
| GB | 1038490 A | 8/1966 |
| JP | 61-023862 | 2/1986 |
| JP | 02-259268 | 10/1990 |
| JP | 08-049623 | 2/1996 |
| JP | 2008-334077 | 12/1996 |
| JP | 2004-324613 A | 11/2004 |
| KR | 2007-0026296 A | 3/2007 |
| KR | 2008-0073635 A | 8/2008 |
| WO | WO-2008-017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.
"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.
"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.
"SmartPlugs—Aviation." SmartPlugs.com. Published: Sep. 2000. Accessed: May 31, 2011. <http://www.smartplugs.com/news/aeronews0900.htm>. pp. 1-3.
Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.
Birchenough, Arthur G. "A Sustained-arc Ignition System for Internal Combustion Engines." Nasa Technical Memorandum (NASA TM-73833). Lewis Research Center. Nov. 1977. pp. 1-15.
Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.
Brooks, Michael. "Space Storm Alert: 90 Seconds from Catastrophe." NewScientist. Mar. 23, 2009. pp. 1-7.
Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.
Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.
InfraTec GmbH. "Evaluation Kit for FPI Detectors | Datasheet—Detector Accessory." 2009. pp. 1-2.
International Search Report and Written Opinion for Application No. PCT/US2009/067044; Applicant: McAlister Technologies, LLC.; Date of Mailing: Apr. 14, 2010 (11 pages).
International Search Report and Written Opinion for Application No. PCT/US2010/002076; Applicant: McAlister Technologies, LLC.; Date of Mailing: Apr. 29, 2011 (8 pages).
International Search Report and Written Opinion for Application No. PCT/US2010/002077; Applicant: McAlister Technologies, LLC.; Date of Mailing: Apr. 29, 2011 (8 pages).
International Search Report and Written Opinion for Application No. PCT/US2010/002078; Applicant: McAlister Technologies, LLC.; Date of Mailing: Dec. 17, 2010 (9 pages).
International Search Report and Written Opinion for Application No. PCT/US2010/042812; Applicant: McAlister Technologies, LLC.; Date of Mailing: May 13, 2011 (9 pages).
International Search Report and Written Opinion for Application No. PCT/US2010/042815; Applicant: McAlister Technologies, LLC.; Date of Mailing: Apr. 29, 2011 (10 pages).
International Search Report and Written Opinion for Application No. PCT/US2010/042817; Applicant: McAlister Technologies, LLC.; Date of Mailing: Apr. 29, 2011 (8 pages).
Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.
Non-Final Office Action for U.S. Appl. No. 12/006,774; Applicant: McAlister Technologies, LLC; Date of Mailing: Jan. 30, 2009, 18 pages.
Non-Final Office Action for U.S. Appl. No. 12/581,825; Applicant: McAlister Technologies, LLC; Date of Mailing: Mar. 25, 2011 (15 pages).
Non-Final Office Action for U.S. Appl. No. 12/804,510; Applicant: McAlister Technologies, LLC; Date of Mailing: Mar. 1, 2011 (10 pages).
Non-Final Office Action for U.S. Appl. No. 12/961,453; Applicant: McAlister Technologies, LLC; Date of Mailing: Jun. 9, 2011 (4 pages).
Notice of Allowance for U.S. Appl. No. 12/006,774; Applicant: McAlister Technologies, LLC; Date of Mailing: Jul. 27, 2009, 20 pages.
Pall Corporation, Pall Industrial Hydraulics. Increase Power Output and Reduce Fugitive Emissions by Upgrading Hydrogen Seal Oil System Filtration. 2000. pp. 1-4.
Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/054361; Applicant: McAlister Technologies, LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

Non-Final Office Action for U.S. Appl. No. 12/961,461; Applicant: McAlister et al.; Date of Mailing: Jan. 17, 2012, 39 pages.

International Search Report and Written Opinion for Application No. PCT/US2011/024778 Applicant: McAlister Technologies, LLC.; Date of Mailing: Sep. 27, 2011 (10 pages).

Final Office Action for U.S. Appl. No. 13/027,051; Applicant: McAlister Technologies, LLC; Date of Mailing: Oct. 20, 2011, 10 pages.

* cited by examiner

INTEGRATED FUEL INJECTOR IGNITERS WITH CONDUCTIVE CABLE ASSEMBLIES

CROSS-REFERENCE TO RELATED APPLICATIONS

The present application claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. The present application is a continuation-in-part of PCT Application No. PCT/US09/67044, filed Dec. 7, 2009 and titled INTEGRATED FUEL INJECTORS AND IGNITERS AND ASSOCIATED METHODS OF USE AND MANUFACTURE. The present application is a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. The present application is a continuation-in-part of U.S. patent application Ser. No. 12/581,825, filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety.

TECHNICAL FIELD

The following disclosure relates generally to fiber optic and/or conductive cable assemblies and centering brush bearings and associated components for operating a fuel injection valve.

BACKGROUND

Fuel injectors are used to inject fuel into a combustion chamber of a combustion engine. The fuel is generally pressurized and released into the combustion chamber at a specific time relative to a stroke of the engine when a valve is opened between a chamber containing the pressurized fuel and the combustion chamber. Recent advances in control technology have allowed great efficiency and power production gains from monitoring a combustion event, such as temperature, light, pressure, or movement within the combustion chamber. However, conventional fuel injection valves and combustion chambers are not equipped to monitor the combustion events, and in many existing engines can not easily be adapted for use with monitoring equipment. In many fuel injector configurations, the size of the bore through which the fuel injector enters the combustion chamber is small and limits the type of equipment that can be used to monitor the combustion event. Accordingly, there exists a need for an improved way to deliver fuel to a combustion chamber and to measure a combustion event within the chamber.

DETAILED DESCRIPTION

The present application incorporates by reference in their entirety the subject matter of each of the following U.S. patent applications, filed concurrently herewith on Jul. 21, 2010 and titled: INTEGRATED FUEL INJECTORS AND IGNITERS AND ASSOCIATED METHODS OF USE AND MANUFACTURE; FUEL INJECTOR ACTUATOR ASSEMBLIES AND ASSOCIATED METHODS OF USE AND MANUFACTURE; SHAPING A FUEL CHARGE IN A COMBUSTION CHAMBER WITH MULTIPLE DRIVERS AND/OR IONIZATION CONTROL; CERAMIC INSULATOR AND METHODS OF USE AND MANUFACTURE THEREOF; METHOD AND SYSTEM OF THERMOCHEMICAL REGENERATION TO PROVIDE OXYGENATED FUEL, FOR EXAMPLE, WITH FUEL-COOLED FUEL INJECTORS; and METHODS AND SYSTEMS FOR REDUCING THE FORMATION OF OXIDES OF NITROGEN DURING COMBUSTION IN ENGINES.

The present disclosure describes devices, systems, and methods for providing a fuel injector assembly including a fiber optic and/or electrically conductive cable and optical combustion measuring unit. The disclosure further describes a bearing comprising generally rigid bristles extending from the cable to maintain the cable within a channel of a fuel injector, as well as associated systems, assemblies, components, and methods. Certain details are set forth in the following description and in FIGS. 1-8C to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

Figure 1:
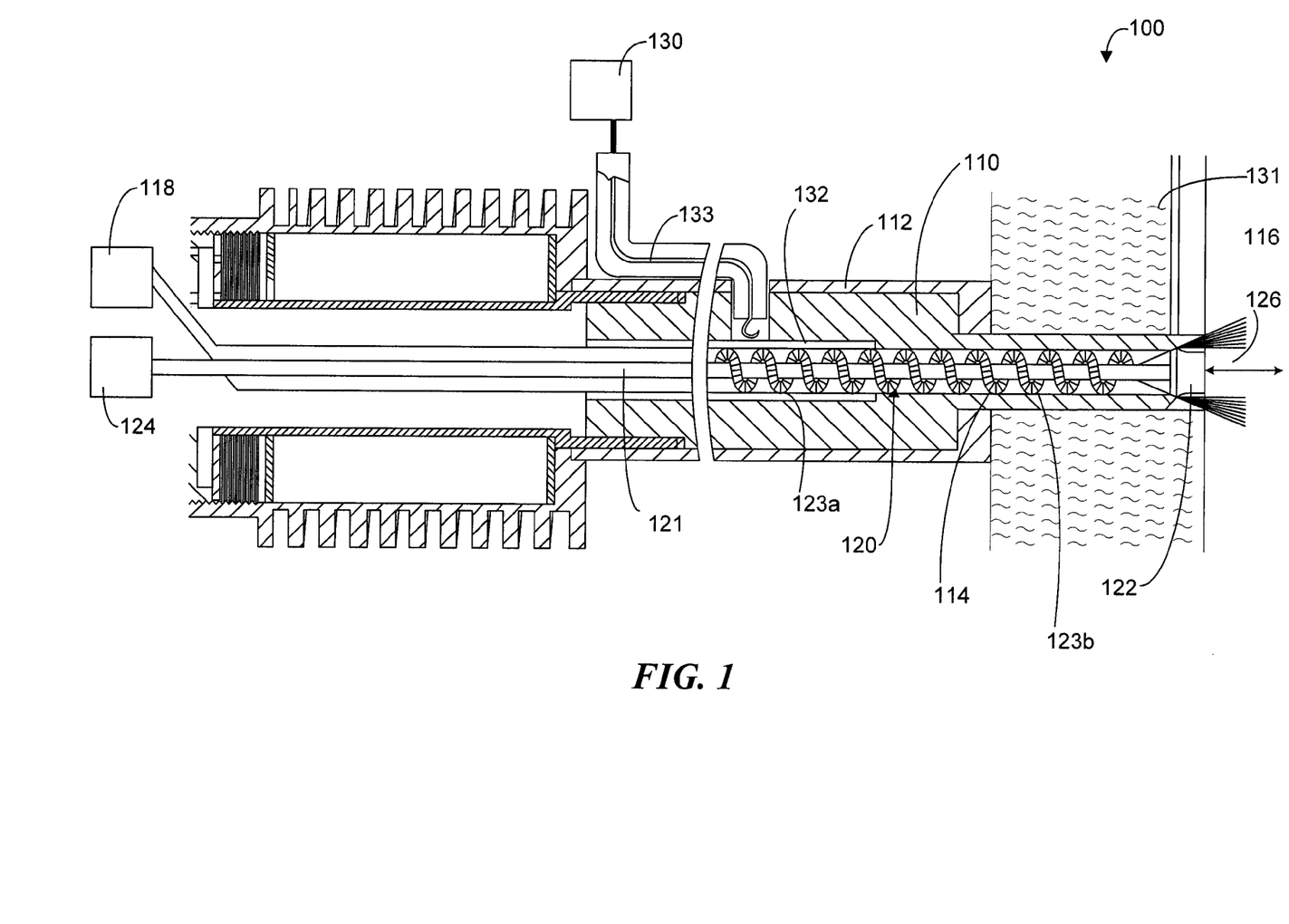
FIG. 1 is a schematic cross-sectional side view of a fuel injector in accordance with an embodiment of the disclosure.

FIG. 1 is a schematic cross-sectional side view of a fuel injector assembly 100 in accordance with several embodiments of the present disclosure. The assembly 100 includes a dielectric body 110 having a channel 114 extending longitudinally through the body 110. The channel 114 extends between a fuel combustion chamber 116 and a fuel reservoir 118 to carry fuel from the fuel reservoir 118 along the channel 114 and into the combustion chamber 116. The fuel injector assembly 100 can also include a housing 112 surrounding the body 110. The housing 112 can be an electro-magnetic shield or a mechanical reinforcement to strengthen the assembly 100. The housing 112 is optional, and can be included in applications where the additional strength and/or electrical shielding are advantageous. The assembly 100 can further include an electrically conductive cable assembly 120 contained in the channel 114 that can include a cable body 121 with a valve 122 at an end of the cable body 121 positioned between the channel 114 and the fuel combustion chamber 116. The assembly 100 can also include a valve actuator 124, such as a solenoid, a spring, or other actuator, that is connected to the cable body 121 and moves the valve 122 back and forth to actuate the valve 122 to inject fuel into the combustion chamber 116. The valve 112 can include a sensor 126, such as an optical head, that can detect a combustion event in the fuel combustion chamber 116 by detecting at least one of temperature, light, pressure, sound, or motion within the combustion chamber. The cable 120 can relay a signal representing the combustion event through the cable body 121.

The combustion chamber 116 contains a piston (not shown) that is driven by timed bursts of combusted fuel in the combustion chamber 116. The fuel injector assembly 100 is configured to deliver precisely timed quantities of fuel into the combustion chamber to mix with oxygen in the chamber. The piston can pressurize the fuel-oxygen mixture, and a sparkplug (or equivalent) ignites the fuel in the combustion chamber 116 to move the piston, which delivers power to a crankshaft (not shown). To assist fuel delivery, the assembly 100 can create a plasma by ionizing a portion of the fuel to force the fuel into the combustion chamber 116 quickly and efficiently. To create the plasma, an electrical current can be delivered from an ionizing power source 130 to electrodes in the channel 114. In some embodiments, the valve 122 and an engine section 131 near the valve 122 can operate as the electrodes. Further details of fuel injectors, combustion chambers, and related devices, techniques, and methods are given in U.S. patent application Ser. No. 12/653,085, which is incorporated herein by reference in its entirety.

Figure 2A:
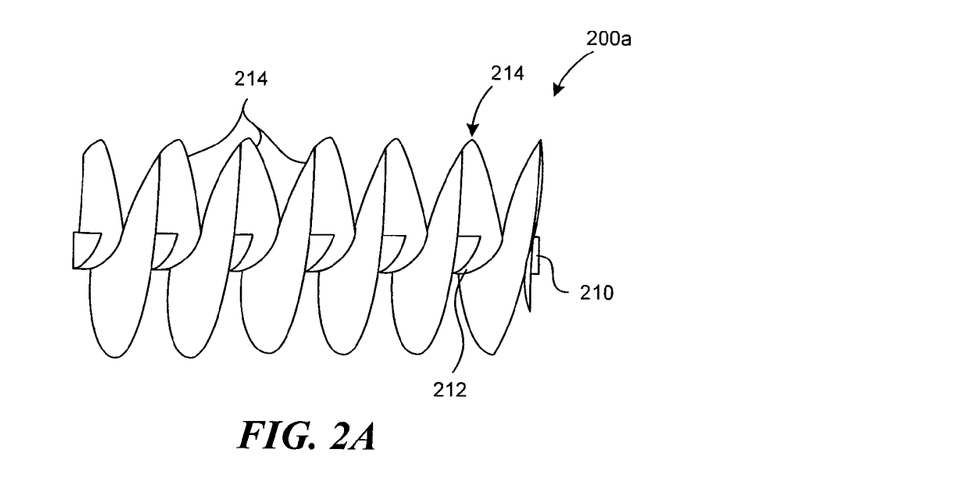
FIG. 2A is an isometric view of a cable according to embodiments of the disclosure.
Figure 2B:
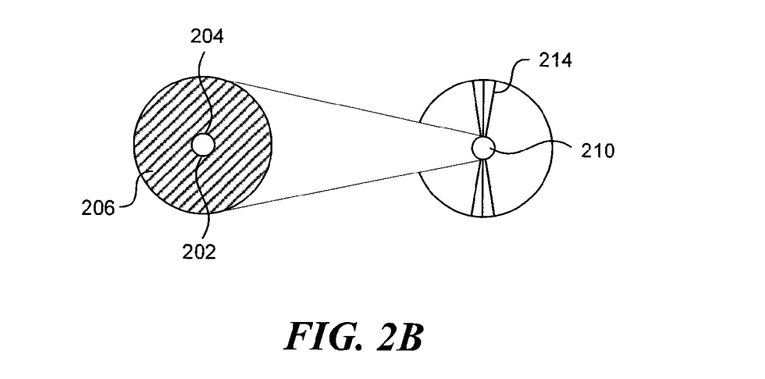
FIG. 2B is a cross-sectional view of the cable of FIG. 2A according to embodiments of the disclosure.

FIGS. 2A-7 illustrate various isometric and cross-sectional views of the cable body 121 according to several embodiments of the present disclosure. FIG. 2A shows an isometric view of a cable 200a, and FIGS. 2B and 2C show cross-sectional views of the cable 200a. FIG. 2B shows a single stem tube 210, including a fiber optic component 202, a cladding 204, and a sheath 206. The fiber optic component 202 can include multiple fiber optic cores, and can be arranged off-center relative to the stem tube 210 in various arrangements. The fiber optic component 202 can be made of any material that perpetuates an optical signal, such as silica, fluorozirconate, fluoroaluminate, chalcogenide glass, sapphire, or phosphate glass. The fiber optic component 202 can be adapted to transmit optical signals of different wavelengths and types. Also, the cladding 204 can be made of different materials and in various combinations with materials of the fiber optic core 202. The sheath 206 can be electrically conductive or electrically non-conductive, and can be load-bearing. In some embodiments, the sheath 206 can be omitted, and the fiber optic component 202 can be made of a relatively strong material such as fiber glass, polyimide, polyamide-imide, aluminum fluoride, quartz, and sapphire, and configured to withstand tensile forces caused in the stem tube 210 as the valve 122 is actuated.

Figure 2C:
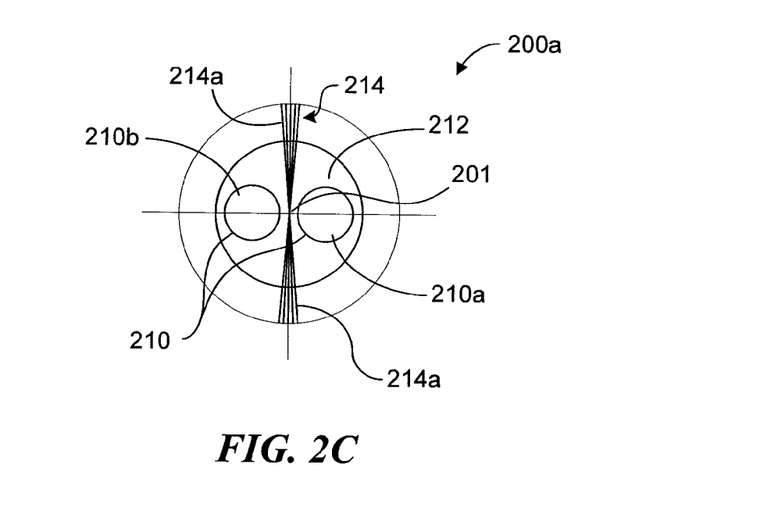
FIG. 2C is a cross-sectional view of the cable of FIG. 2A according to embodiments of the disclosure.

The cable 200a can have multiple stem tubes 210, as shown in FIG. 2C, extending along the cable 200a. An encasement 212 made of a plastic or other insulating material can surround the stem tubes 210 to protect the stem tubes 210 from the fuel flowing through the channel 114 (FIG. 1) or any other environmental hazard that may damage the stem tubes 210. The encasement 212 can surround any group of the stem tubes 210, including a single stem tube 210. The encasement 212 is optional and can be omitted. In some embodiments, the cable 200a includes a brush bearing 214 having bristles 214a extending between the stem tubes 210 and extending radially from a central point 201 of the cable 200a. In some embodiments, the stem tubes 210 are twisted in a helical configuration, and therefore the bristles 214a can also form a helix around the center point 201. The brush bearing 214 can maintain the cable 200a at least generally centered within the channel 114 as the cable 200a is vibrated or moved longitudinally to actuate a valve or other device. The brush bearing 214 can provide a unidirectional bearing that maintains motion of the valve 122 (FIG. 1) on a centerline of the channel 114 (FIG. 1). The bearing 214 can also provide protection for the stem tubes in the channel 114. The bristles 214a can be made of carbon and/or copper filled carbon brushes similar to those utilized against the rotors of motors and generators.

The stem tubes 210 can be an electrically conductive optical strand that can withstand a tensile load caused when the cable 200a is used to actuate a valve or other device. For example, the stem tubes 210 can be made of a material, such as an aluminum fluoride, that operates as an optical waveguide, is electrically conductive, and has sufficient tensile strength to be used to actuate a fuel injection valve or other device. The cable 200a can accordingly be used to carry an optical signal from the sensor 126, to carry a voltage to the electrodes to cause the plasma in the fuel, and to actuate the valve 122. The voltage can be a DC voltage, or an AC voltage at an appropriate frequency, including a high-frequency. In some embodiments, the stem tubes 210 can have different combinations of these characteristics. For example, the cable 200*a* can include a first stem tube 210*a* that includes optical fibers for carrying an optical signal, and a second stem tube 210*b* that is a tensile member. Either of the first or second stem tubes 210*a*, 210*b* can also be electrically conductive in order to carry a voltage to an electrode pair to ionize a portion of the fuel. In some embodiments, the stem tubes 210 are both made of optical fibers having sufficient strength to withstand a tensile load caused by actuating the valve 122.

Twisting or braiding the conductive cable assembly diffuses the voltage across the cross-sectional area of the cable assembly and reduces problems associated with a phenomenon known as the "skin effect." At high-frequency, the electrical signal in a conductor tends to be carried primarily at the outermost portion, or skin, of the conductor. This phenomenon causes increased resistance because it reduces the effective cross-sectional area of the conductor, which is inversely related to the resistance of the conductor. The skin effect can be overcome by braiding or otherwise weaving wires in a litz array such that each wire in an array of wires alternates between the outside and inside of the wire at different portions of the wire. Generally, each wire is electrically isolated from the rest to prevent the wires from shorting together into a composite wire which also experiences the skin effect.

Figure 3A:
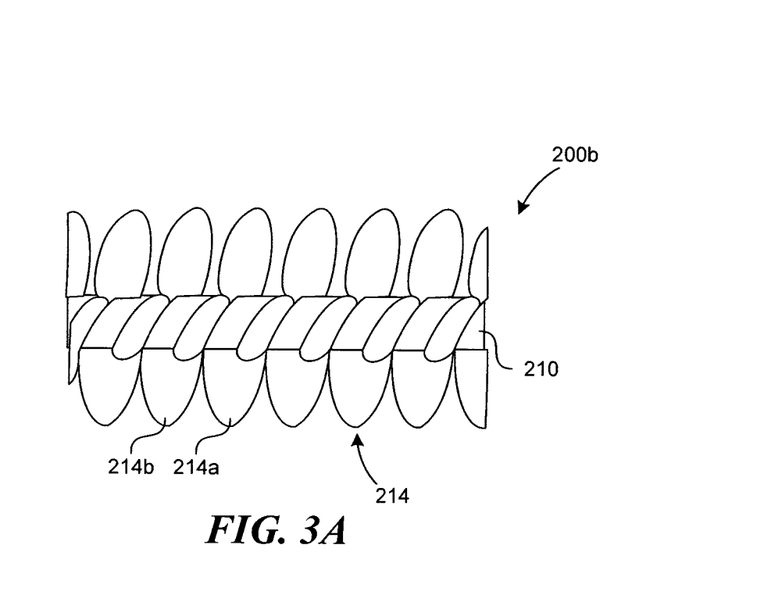
FIG. 3A is an isometric view of a cable according to embodiments of the disclosure.
Figure 3B:
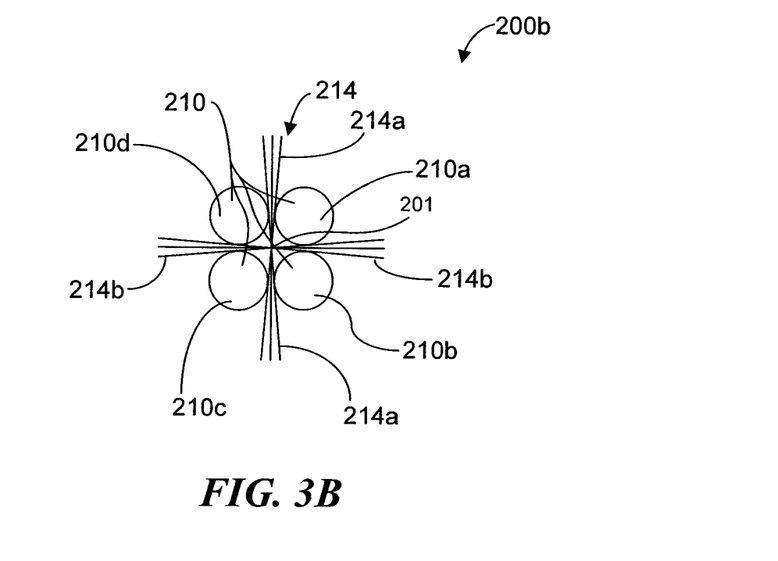
FIG. 3B is a cross-sectional view of the cable of FIG. 3A according to embodiments of the disclosure.

FIG. 3A illustrates an isometric view of another cable 200*b*, and FIG. 3B depicts a cross-sectional view of the cable 200*b* according to several embodiments of the present disclosure. The cable 200*b* can include four stem tubes 210 and a brush bearing 214 similar to the cable 200*a* shown in FIGS. 2A-2C. The brush bearing 214 can include a first section of bristles 214*a* and a second section of bristles 214*b* extending between the stem tubes 210 at an angle relative to the first section of bristles 214*a*. The strands can be wound, causing the two bristle sections to form a double-helix about a center point 201 shown in FIG. 3B. The first bristles 214*a* and second bristles 214*b* can be made of the same material, or different materials.

In some embodiments, a first stem tube 210*a* can be an optical waveguide, a second stem tube 210*b* can be electrically conductive, and a third stem tube 210*c* can be a tensile member capable of withstanding a tensile load caused when the valve actuator 124 pulls on the cable 200*b*. Accordingly, the optical signal from the sensor 126 can be carried by the first stem tube 210*a*, the electricity for creating the plasma can be carried by the second stem tube 210*b*, and the tensile load can be carried by the third stem tube 210*c*. A fourth stem tube 210*d* can be an optical fiber, an electrical conductor, or a tensile member, or have any combination of these characteristics. In some embodiments, the stem tubes 210 can all have different combinations of these characteristics, as needed by a particular application, and according to design preferences. For example, a material with the optical, electrical, and mechanical properties may allow the cable 200*b* to have a smaller diameter, but may be more expensive than a material having only one or two of these properties but may increase the diameter of the cable 200*b*. Although the stem tubes 210 are shown here having a similar diameter, a given application may call for different stem tubes 210 to have different diameters.

Figure 4A:
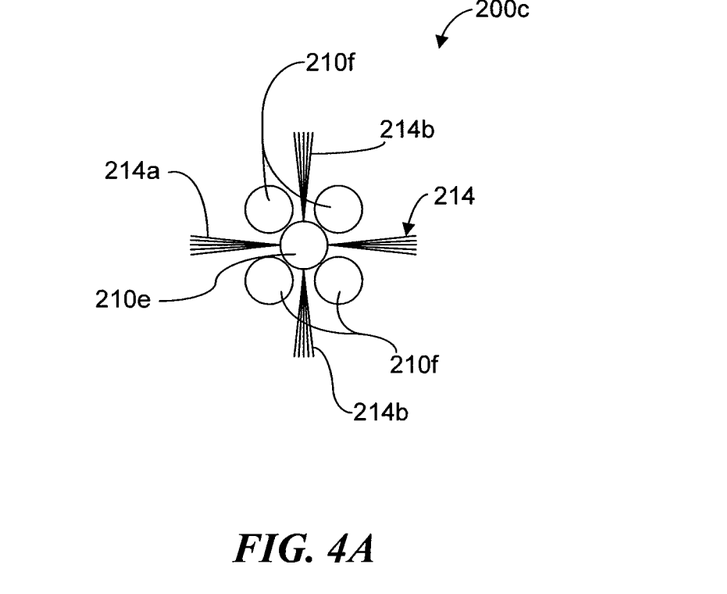
FIG. 4A is an isometric view of a cable according to embodiments of the disclosure.
Figure 4B:
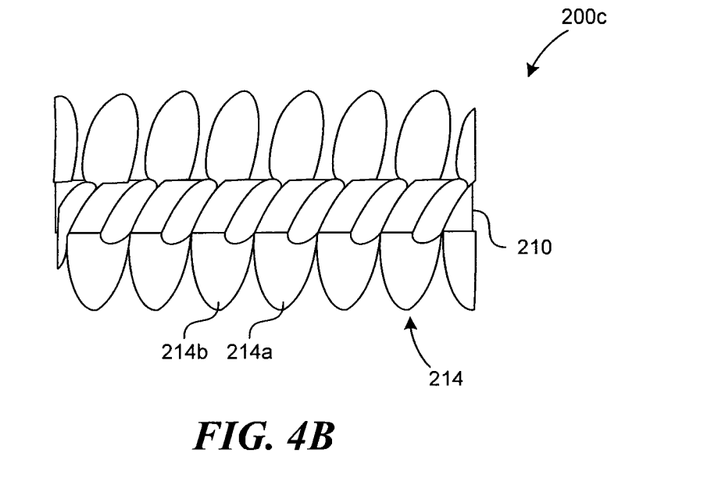
FIG. 4B is a cross-sectional view of the cable of FIG. 4A according to embodiments of the disclosure.
Figure 5:
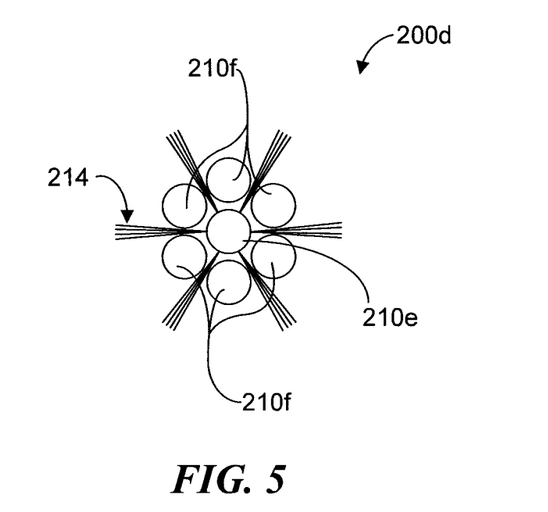
FIG. 5 is a cross sectional view of a cable according to embodiments of the disclosure.

FIGS. 4A, 4B, and 5 show cables 200*c* and 200*d*, respectively, having alternative arrangements. Cables 200*c* and 200*d* include a central stem tube 210*e* and several peripheral stem tubes 210*f*. Many features of these cables 200*c* and 200*d* are generally similar to features of the cables 200*a* and 200*b* discussed above in FIGS. 2A-3B including a brush bearing 214. It is to be understood that various other configurations are possible, including various numbers and arrangements of the stem tubes 210 and bristles.

Figure 6:
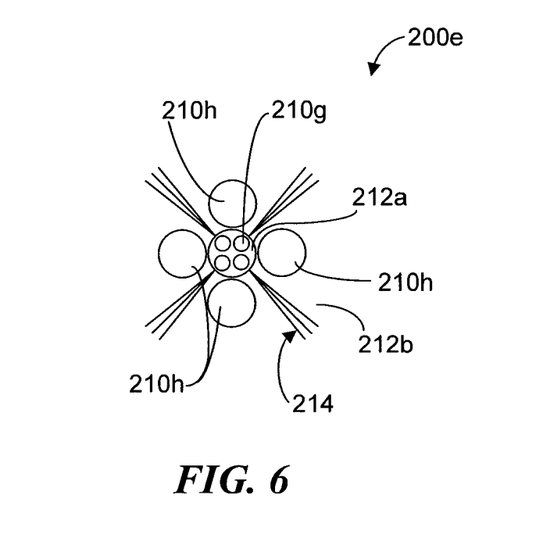
FIG. 6 is a cross sectional view of a cable according to embodiments of the disclosure.

FIG. 6 shows another cable 200*e* in which a first group of stem tubes 210*g* have a first diameter, and a second group of stem tubes 210*h* have a second, larger diameter. The cable 200*e* can include a first encasement 212*a* around the first group of stem tubes 210*g* and a second encasement 212*b* around the second group of stem tubes 210*h*. In some embodiments, the cable 200*e* does not include an encasement 212. Due to their larger size, the second group of stem tubes 210*h* can be tensile members, and the first group of stem tubes 210*g* can be the optical and/or electrical strands. In any configuration shown herein that includes at least one electrically conductive strand, the stem tubes 210 can be arranged in a litz array to mitigate the skin effect discussed above. The size, shape, and number of stem tubes 210 depends on many variables, and this disclosure is not limited to a specific arrangement or number of strands.

Figure 7:
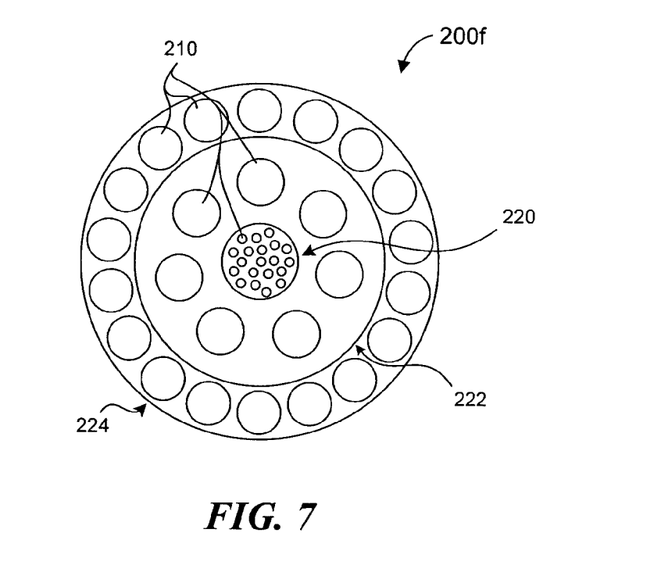
FIG. 7 is a cross-sectional view of a cable according to embodiments of the disclosure.

FIG. 7 shows yet another cable 200*f* including three groups of stem tubes 210. The cable 200*f* includes a first group 220 of stem tubes 210, a second group 222 of stem tubes 210 wound at least generally concentrically around the first group 220, and a third group 224 wound at least generally concentrically around the second group 222. In some embodiments, stem tubes 210 in the first group 220 contains optical fibers, stem tubes 210 in the second group 222 are electrically conductive, and stem tubes 210 in the third group 224 includes tensile members. The groups can be mechanically insulated such that a tensile force carried by the tensile members in the third group 224 does not translate to stem tubes 210 in the second group 222 or the first group 220. Similarly, stem tubes 210 in one group can be electrically and/or optically insulated from stem tubes 210 in other groups. In other embodiments, the third group can be omitted because the tensile load is carried by stem tubes 210 in the first group 220 or in the second group 222. Each group can include a plurality of stem tubes 210, which can be braided or woven in a litz array to mitigate the skin effect in the cable 200*f*. In some embodiments, the electrically conductive portions of cable 200*f* are used to transmit a DC voltage. Accordingly, a single stem tube 210 can be used, or the stem tubes 210 can be unbraided, because the skin effect generally is not present with a DC voltage. The embodiments shown in FIG. 7 may include bristles (not shown) similar to embodiments shown and described above with reference to FIGS. 2-6.

Referring back to FIG. 1, the channel 114 can include an electrically conductive sleeve 132 connected to a power source 130 through a wire 133. The sleeve 132 can be stationary relative to the body 110 while the cable body 121 moves back and forth in the channel 114 as the valve 122 is actuated. A first portion of the bristles 123*a* can be electrically conductive to form an electrical path between the power source 130 and the electrodes 122, 131. The conductive bristles 123*a* can overlap with the sleeve 132 sufficiently that the bristles 123*a* contact the sleeve 132 through the stroke of the cable body 121 from the closed position to the open position. The voltage can be applied through the bristles 123*a* and can be further carried by the cable body 121 between the conductive bristles 123*a* and the valve 122. In some embodiments, a second portion of the bristles 123*b* that does not contact the sleeve 132 is not necessarily part of the electrical path between the valve 112 and the ionizing power source 130. Accordingly, the bristles 123*b* can be chosen of a material to reduce friction and not necessarily for their electrical properties. For example, the bristles 123b can be made of a non-conductive nylon or a polyamide-imide. To mitigate wear in the channel 114, the channel 114 can be lined with a plating or liner made of an alloy similar to the material disclosed in U.S. Pat. No. 4,742,265, which is incorporated herein by reference. This arrangement allows the wire 133 to remain stationary while the cable 120 moves to avoid fatigue in the wire 133. Also, the stroke of the cable 120 between open and closed can be much larger than other designs because the wire 133 does not experience fatigue caused by moving with the wire 133. A larger stroke allows the assembly 100 to be used in large engines that call for a relatively large quantity of fuel to be injected into the combustion chamber 116, such as large ships and construction equipment, etc.

Figure 8A:
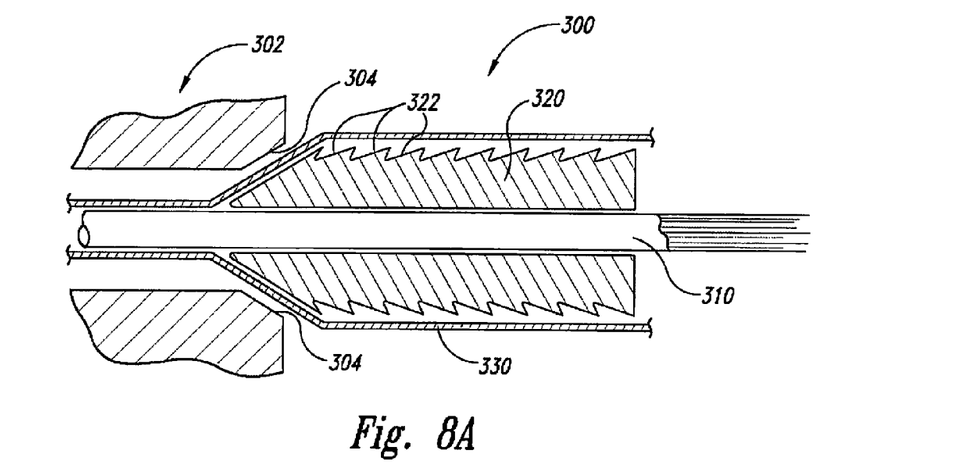
FIG. 8A is a length-wise cross-sectional view of a cable having a stop according to embodiments of the disclosure.
Figure 8B:
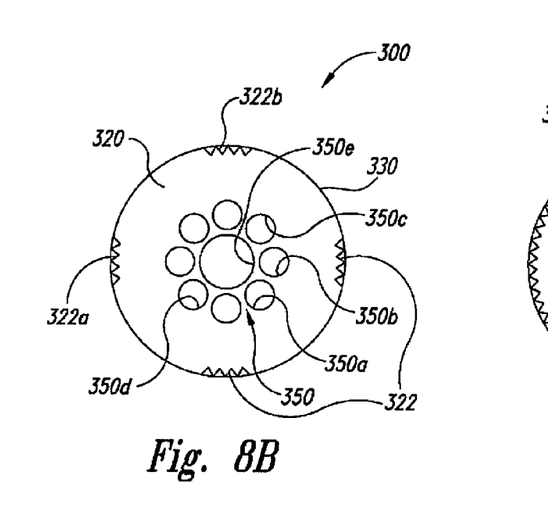
FIG. 8B is a width-wise cross-sectional view of the cable of FIG. 8A according to embodiments of the disclosure.
Figure 8C:
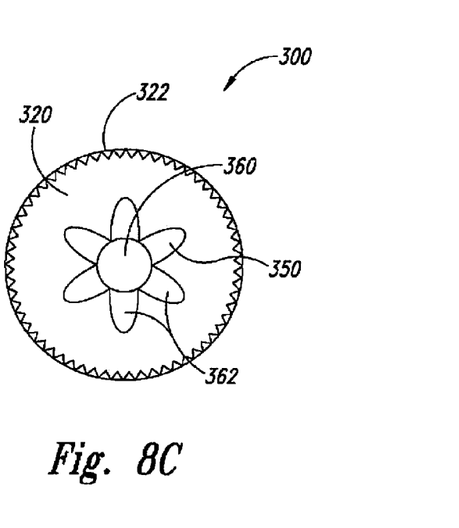
FIG. 8C is a width-wise cross-sectional view of the cable of FIG. 8A according to embodiments of the disclosure.

FIGS. 8A-8C illustrate other embodiments of the present disclosure. FIG. 8A shows a cross-sectional view of a cable assembly 300 and an actuator 302. The cable assembly 300 includes a center cable section 310, a stop 320 around a portion of the center cable section 310, and an outer cable section 330 layered at least generally concentrically with the stop 320 and the center cable section 310. The cable assembly 300 is situated within the actuator 302 which actuates the cable assembly 300. The actuator 302 can include a solenoid, a magnet, a spring, or any other equivalent device to actuate the cable assembly 300. The actuator 302 can be generally similar to the actuator 124 shown in FIG. 1. The actuator 302 can include a shoulder 304 against which the cable assembly 300 abuts to limit the range of motion of the cable assembly 300 relative to the actuator 302. The shoulder 304 can be sloped to at least generally match a slope of the stop 320 to provide a large contact area to distribute pressure caused when the actuator 302 pulls the cable assembly 300 into the actuator 302. In some embodiments, the shoulder 304 is not part of the physical housing of the actuator 302, and is a separate piece, such as a collar, that has sufficient rigidity to withstand the actuating force from the actuator 302. Limiting the motion of the cable assembly 300, and a valve (or other equipment) at an end of the cable assembly 300, allows for the valve to be opened a precise, consistent distance each time the cable assembly 300 is actuated.

The stop 320 can be fixed to the central cable section 310, and can include barbs 322 on an outer surface contacting the outer cable section 330. The barbs 322 fix the outer cable section 330 to the stop 320 so that when the actuator 302 actuates the cable assembly 300, the stop 320 abuts the shoulder 304 and stops the cable assembly 300 from moving relative to the shoulder 304. In some embodiments, the barbs 322 are directional. For example, as shown in FIG. 8A, the barbs 322 are directed away from the actuator 302. In other embodiments the barbs 322 are not directional. The stop 320 can include an adhesive or other techniques to prevent the stop 320 from moving relative to the central cable section 310 and the outer cable section 330. The stop 320 can be made of a dielectric material, or an electrically conductive material. The stop 320 can be at least generally rigid and withstand the compressive forces caused by the actuator 302 when the stop 320 is pressed against the shoulder 304. The stop 320 also adds section stiffness to the able assembly. Accordingly, the inner and outer cable section s 310, 330 can be made of a generally flexible material because the stop 320 provides a measure of rigidity at least portions of the cable assembly 300. In portions where additional stiffness is desired, various thermoplastic or thermoset polymers may be used to stiffen and/or reduce the surface energy and/or to provide a smooth surface to reduce sliding friction between the outer cable section 330 and a channel.

The central cable section 310 and the outer cable section 330 can each contain stem tubes generally as described above with respect to FIGS. 2-7. In some embodiments, the outer cable section 330 includes tensile members, and the central cable section 310 includes fiber optics and electrically conductive stem tubes, or a combination of fiber optic components and electrically conductive sheaths. Virtually any combination and arrangement of stem tubes is possible. FIG. 8B illustrates a cross-sectional view of a cable assembly 300 as shown in FIG. 8A. The cable assembly 300 includes a plurality of stem tubes 350, a stop 320, and barbs 322. (The outer cable section 330 is not shown.) The stem tubes 350 can include fiber optic components, electrically conductive components, and tensile members in any combination and arrangement. For example, a first stem tube 350a can be an optical fiber, a second stem tube 350b can be an optical fiber having an electrically conductive sheath, a third stem tube 350c can be a tensile member that is not necessarily electrically or optically conductive, and a fourth stem tube 350d can be and electrically conductive tensile member. The stem tubes 350 can be wound in a litz array to mitigate the "skin effect" that can occur when the cable assembly 300 is used to transmit high frequency, AC voltages. The stem tubes 350 can also include one or more stem tubes 350e at a center of the cable assembly 300. In some embodiments, some of the stem tubes 350 can carry optical signals of a first wavelength, while another group of the stem tubes 350 carries optical signals of a second wavelength. For example, stem tube 350a can carry light in the visible spectrum; stem tube 350b can carry an infrared signal; and stem tube 350c can carry an ultraviolet signal. Other combinations are possible. The stem tubes 350 that are electrically conductive can also have differing characteristics. For example, a group of stem tubes 350 can be used with a high-frequency AC voltage and can accordingly be arranged in a litz array, while another group of stem tubes 350 is used with a DC voltage, and therefore need not be braided or woven in a litz array. The cable assembly 300 can also include bristles (not shown) similar to those shown above with reference to FIGS. 2-7. The bristles can be positioned at a different location along the cable assembly 300 than the stop 320 to avoid interfering with the stop 320.

The barbs 322 are shown in FIG. 8B at four, cardinal directions around the circumference of the stop 320. In other embodiments, the barbs 322 are arranged continuously around the circumference of the cable assembly 300, or in a different distribution. Different applications may call for more or less force from the actuator 302 (FIG. 8A), and accordingly, the barbs 322 can be adjusted to withstand an appropriate amount of force.

FIG. 8C illustrates another embodiment of a cable assembly 300 including a central stem tube 360, several peripheral stem tubes 362, a stop, and barbs 322 on the stop. The central stem tube 360 can be an optical fiber, or include an optical fiber within a sheath. The peripheral stem tubes 362 have a non-circular cross-sectional shape. The peripheral stem tubes 362 can be electrically conductive, and they may be tensile members capable of withstanding a tensile load placed on the cable assembly 300 by an actuator. FIG. 8C shows six peripheral stem tubes 362, but other embodiments can include more or fewer peripheral stem tubes 362. Various other configurations and cross-sectional shapes are possible.

It will be apparent that various changes and modifications can be made without departing from the scope of the disclosure. For example, the number, layout, and materials of the stem tubes 210 may be altered to include alternative materials and processing means. The assembly 100 may include alternative configurations than those shown and described and still be within the spirit of the disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A cable assembly, comprising:
   a stem tube having a first end and a second end, the stem tube including an optical fiber and an electrically conductive sheath;
   electrically conductive bristles extending from the stem tube and configured to maintain the stem tube at least generally aligned within a channel;
   a first electrode connected to the first end, the first electrode being positioned near a second electrode and configured to deliver an ionizing voltage between the first and second electrodes;
   a sensor at the first end of the stem tube configured to directly detect at least one of pressure, temperature, light, or movement and to relay an associated signal along the optical fiber; and
   a cable actuator connected to the second end of the cable and configured to actuate the stem tube by tensioning the stem tube.

2. The cable assembly of claim 1 wherein the channel is within a fuel injector at an interface of a combustion chamber, and the sensor is configured to detect a combustion event in the combustion chamber.

3. The cable assembly of claim 1, further comprising a tensile member extending along the stem tube and configured to bear a tensile load caused when the cable actuator tensions the stem tube.

4. The cable assembly of claim 1 wherein the optical fiber is configured to bear a tensile load caused when the cable actuator actuates the fuel injector by pulling the cable.

5. The cable assembly of claim 1 wherein the stem tube comprises a plurality of stem tubes arranged in a litz array, wherein the litz array is a braided configuration configured to deliver the voltage to the electrode pair.

6. The cable assembly of claim 1 wherein the bristles are generally rigid and maintain the cable generally centered within the channel.

7. The cable assembly of claim 1 wherein the cable further comprises electrically conductive strands arranged concentrically around the optical fibers and configured to deliver the voltage to the electrode pair.

8. The cable assembly of claim 1 wherein the voltage comprises an AC voltage.

9. The cable assembly of claim 1 wherein the voltage comprises a DC voltage.

10. The cable assembly of claim 1 wherein the bristles are configured to maintain the cable at least generally centered within the channel.

11. The cable assembly of claim 1 wherein the bristles are wound around the cable in a helix or a double helix.

12. The cable assembly of claim 1, further comprising an electrically conductive sleeve lining at least a portion of the channel, wherein at least a portion of the bristles are electrically conductive and form part of an electrical path for the voltage between the electrically conductive sleeve and the electrode pair.

13. The cable assembly of claim 12 wherein the electrically conductive sleeve lines a first portion of the channel but not a second portion of the channel, and wherein bristles that contact the second portion of the channel are not electrically conductive and have low friction between the channel and the bristles.

14. The cable assembly of claim 13 wherein the cable moves between a first position when the valve is closed and a second position when the valve is open, and wherein the conductive sleeve contacts at least a portion of the electrically conductive bristles at both the first position and the second position.

15. The cable assembly of claim 12, further comprising an electrical lead configured to deliver the voltage to the electrically conductive sleeve, wherein the electrical lead remains stationary relative to the electrically conductive sleeve as the cable moves between the first position and the second position.

16. The cable assembly of claim 1 wherein the stem tube comprises a plurality of stem tubes arranged into a group of central stem tubes and a group of outer stem tubes, the cable assembly further comprising a stop fixed to the central stem tubes and to the outer stem tubes, wherein the stop is between the central stem tubes and the outer stem tubes, and wherein the stop is configured to limit the movement of the cable assembly within the channel.

17. The cable assembly of claim 1 further comprising a stop fixed to the stem tube and configured to engage a shoulder that is fixed relative to the channel, wherein the stop is configured to limit a range of motion of the cable assembly within the channel.

18. A fuel injector, comprising:
   a dielectric body with a channel extending between a fuel reservoir and a fuel combustion chamber;
   a cable assembly positioned within the channel, the cable assembly including—
      an optical fiber,
      an electrically conductive strand, and
      a plurality of generally rigid filaments extending radially from the optical fiber and the electrically conductive strand and contacting the dielectric body to maintain the cable generally centered within the channel;
   a valve operably coupled to the cable and positioned between the channel and the fuel combustion chamber;

a valve actuator connected to the cable and configured to move the cable in the channel to actuate the valve and permit fuel to enter the fuel combustion chamber from the channel;

a sensor positioned on the valve and configured to directly detect a combustion event in the fuel combustion chamber, wherein the sensor is connected to at least one of the first and second bundles and configured to relay a signal along the optical fibers to report the combustion event.

19. The fuel injector of claim 18, further comprising an electrically conductive lining in a portion of the channel, wherein at least a portion of the filaments are electrically conductive and contact the electrically conductive lining.

20. The fuel injector of claim 19, further comprising an electrical lead contacting the electrically conductive lining, wherein the electrical lead, the electrically conductive lining, the electrically conductive filaments, and the valve form an electrical path through which electricity is delivered to form a plasma in the channel to deliver the fuel into the fuel combustion chamber.

21. The fuel injector of claim 18 wherein the optical fiber and the electrically conductive strand are wound such that the filaments form a helix around the cable.

22. The fuel injector of claim 18 wherein at least one of the optical fiber and the conductive strand is configured to bear a tensile load in the cable caused by the valve actuator.

23. The fuel injector of claim 18 wherein at least one of the optical fiber and the conductive strand comprises a plurality of stem tubes arranged in a braided litz array.

24. A valve actuation mechanism, comprising
a valve;
means for sensing at least one of heat, light, pressure, or motion, the means for sensing being positioned at the valve;
a cable connected to the valve, the cable being configured to—
sense at least one of heat, pressure, and motion opposite the valve,
carry an optical signal from the means from sensing to a controller, and
conduct electricity along the cable;
means for actuating the valve by pulling on the cable to move the valve between a closed position to an open position;
a brush bearing comprising a plurality of bristles protruding from the cable to maintain the cable at least generally centered within a bore, wherein the brush bearing permits the cable to move between the open position and the closed position within the bore.

25. The valve actuation mechanism of claim 24 wherein the cable comprises at least one optical fiber configured to—
withstand tensile forces caused by the means for actuating the valve; and
carry an optical signal from the means for sensing.

26. The valve actuation mechanism of claim 24 wherein the optical fiber comprises an optical core and an electrically conductive sheath surrounding the optical core.

27. The valve actuation mechanism of claim 25 wherein the optical fiber is made of at least one of fiber glass, polyimide, polyamide-imide, aluminum fluoride, quartz, and sapphire.

28. The valve actuation mechanism of claim 24 wherein the cable comprises—
an optical fiber configured to carry the optical signal; and
an electrically conductive strand configured to conduct electricity along the cable and to bear a tensile load caused by the means for actuating.

29. The valve actuation mechanism of claim 24 wherein the valve comprises a valve for a fuel injector, and the means for sensing comprises means for detecting a combustion event through the valve.

30. The valve actuation mechanism of claim 24, further comprising means for biasing the valve toward at least one of the open position and the closed position.

31. The valve actuation mechanism of claim 24 wherein the cable comprises a plurality of strands arranged in a litz array.

32. The valve actuation mechanism of claim 24 wherein the cable comprises a plurality of concentric layers of strands.

33. The valve actuation mechanism of claim 24 wherein at least a portion of the bristles and at least a portion of the bore are electrically conductive.

34. The valve actuation mechanism of claim 24 wherein the cable comprises at least two bundles, and the bristles of the brush bearing extend between the bundles.

35. A method of manufacturing a litz wire, comprising:
forming a litz wire from a plurality of stem tubes, the stem tubes individually including an optical core and an electrically conductive sheath surrounding the optical core;
forming a brush bearing in the litz wire having bristles extending transversely to the litz wire;
attaching a valve to a first end of the litz wire;
attaching a sensor to the valve, wherein the sensor is coupled to the optical fibers to convey an optical signal from the sensor along the fibers;
coupling the litz wire to a valve actuator; and
positioning the litz wire in a channel of a housing with the valve being configured to actuate to inject a fluid from the housing when the valve actuator actuates the valve, wherein the brush bearing is configured to bear the litz wire at least generally centered within the channel.

36. The method of claim 35 wherein forming the litz wire comprises braiding the plurality of stem tubes, and wherein forming the brush bearing comprises weaving the bristles within the litz wire.

37. The method of claim 35, further comprising coupling the litz wire to an ionizing source and an electrode pair, wherein the ionizing power source is configured to deliver a voltage along the litz wire and ionize at least a portion of the fluid.

38. The method of claim 35 wherein forming the brush bearing comprises forming the bristles into a helix around the litz wire.

* * * * *